United States Patent [19]

Cawley

[11] Patent Number: 5,105,934

[45] Date of Patent: Apr. 21, 1992

[54] CONVEYOR SYSTEM HAVING AN ENDLESS CONVEYOR BELT

[75] Inventor: Keith Cawley, Coltishall, England

[73] Assignee: Frigoscandia Contracting AB, Helsingborg, Sweden

[21] Appl. No.: 345,125

[22] Filed: Apr. 28, 1989

Related U.S. Application Data

[63] Continuation-in-part of Ser. No. 185,774, Apr. 25, 1988, Pat. No. 4,858,750.

[30] Foreign Application Priority Data

Dec. 23, 1988 [GB] United Kingdom ............... 8830179

[51] Int. Cl.⁵ .............................................. B65G 21/18
[52] U.S. Cl. .................................. 198/778; 198/831; 198/838; 198/841; 198/845
[58] Field of Search ............... 198/778, 831, 838, 841, 198/845, 849, 851

[56] References Cited

U.S. PATENT DOCUMENTS

| 782,009 | 2/1905 | Dodge | 198/778 |
|---|---|---|---|
| 792,623 | 6/1905 | Souder | 198/778 X |
| 3,938,651 | 2/1976 | Alfred et al. | 198/778 |
| 4,450,953 | 5/1984 | LeCann et al. | 198/778 |
| 4,565,282 | 1/1986 | Olsson et al. | 198/778 |
| 4,603,776 | 8/1986 | Olsson | 198/778 |

FOREIGN PATENT DOCUMENTS

| 698360 | 10/1940 | Fed. Rep. of Germany | 198/778 |
|---|---|---|---|
| 1290876 | 9/1972 | United Kingdom | 198/778 |

Primary Examiner—D. Glenn Dayoan
Attorney, Agent, or Firm—Edwin D. Schindler

[57] ABSTRACT

A conveyor system wherein an endless conveyor belt follows a helical conveying path with the tiers at least partly in self-supporting relationship, wherein the lowermost tier is supported by a plurality of trolleys mounted on a fixed helical rail, and the trolleys are individually driven by the internal capsten which also drives the conveyor belt at the inside edge of the helical conveyor path.

24 Claims, 4 Drawing Sheets

5,105,934

CONVEYOR SYSTEM HAVING AN ENDLESS CONVEYOR BELT

CROSS REFERENCE TO RELATED APPLICATION

This application is a continuation-in-part of application Ser. No. 185,774, filed Apr. 25, 1988, now U.S. Pat. No. 4,858,750.

FIELD OF THE INVENTION

This invention relates generally to conveyors and in particular to a conveyor system having a conveyor of the kind which comprises an endless belt arranged to convey a product in a helical path consisting of a number of superimposed helically extending tiers.

BACKGROUND TO THE DISCLOSURE

Conveyors of the above-described kind are known in which, at least at the inside or the outside of the helically conveying path, or possibly both, the tiers of the conveyor belt are self-supporting, i.e. by means of spacers or the like any one helically extending tier is supported by the one below it. In this case, means are necessarily provided for supporting the lowermost tier, and this means in effect determines the pitch of the helical conveying path. A known means for this purpose is a supplementary conveyor, which optionally may also be employed to drive the lowermost tier of the stack thereof.

It is an object of this invention to provide an improved means of supporting the lowest tier of a helically extending conveyor belt.

BRIEF SUMMARY OF THE INVENTION

According to the invention, there is provided a conveyor system comprising an endless conveyor belt a portion of the length of which is caused to follow a helical conveying path consisting of a plurality of tiers stacked at least partly in a self-supporting manner one on top of the other, a capstan located inside the helical conveying path for driving the belt, the drum being drivable in rotation about a generally vertical central axis, a plurality of spaced trolleys mounted on a fixed helically extending rail to support the lowermost tier of the stack, and means whereby the trolleys are individually driven directly by the internal capstan.

The helically extending rail preferably extends in a helical path around the major part of a single turn of 360 degrees, and over the remaining minor part has a transition section via which in use the trolleys descend from a raised end of said major part to a lower starting point of said major part. Above the transition section, the conveyor belt may be supported by a fixed transition plate, beyond the end of which begins the next tier of the stack above the lowermost tier.

The trolleys have a vertical component of movement while travelling around the support rail and, for enabling this component of movement whilst also being driven around the support ring, may be slidably attached to vertical guides carried by or forming part of the internal capstan.

A preferred support rail is a rail of generally round cross-section, the trolleys each having at least one wheel with a concavely curved rim for running on said rail. Additionally each trolley preferably has a pair of opposed rollers which engage opposite sides of the vertical guides of the capstan in order to maintain the trolley in a generally constant or upright orientation whilst being driven around the support rail.

The wheel or wheels on each trolley is or are preferably spring mounted to allow limited movements thereof generally along the radius of the helix defined by the support rail. Additionally, said wheel or wheels is or are preferably carried by a supporting element which forms part of the trolley and is pivotally mounted about a vertical axis to allow limited turning movement of the wheels. These measures ensure that the trolleys are free running in use, notwithstanding manufacturing deviations or tolerances from the helical path nominally defined by the support rail.

The conveyor of the invention is more especially intended for conveying a product, such as a food product, within a confined space within which the product is to be treated, for example by freezing. At least the major components of the trolleys, and especially the at least one wheel and the opposed rollers thereof, are preferably made of ultra-high molecular weight (UHMW) plastics material, which has a low coefficient of friction, thus avoiding any requirement to lubricate the trolleys, is very resistant to abrasion, thus ensuring long life, and is non-absorbent to water, which is especially important in the context of industrial freezers.

BRIEF DESCRIPTION OF DRAWINGS

A conveyor in accordance with the invention is exemplified in the following description, making reference to the accompanying drawings, in which.

DESCRIPTION OF EMBODIMENT

Figure 1:
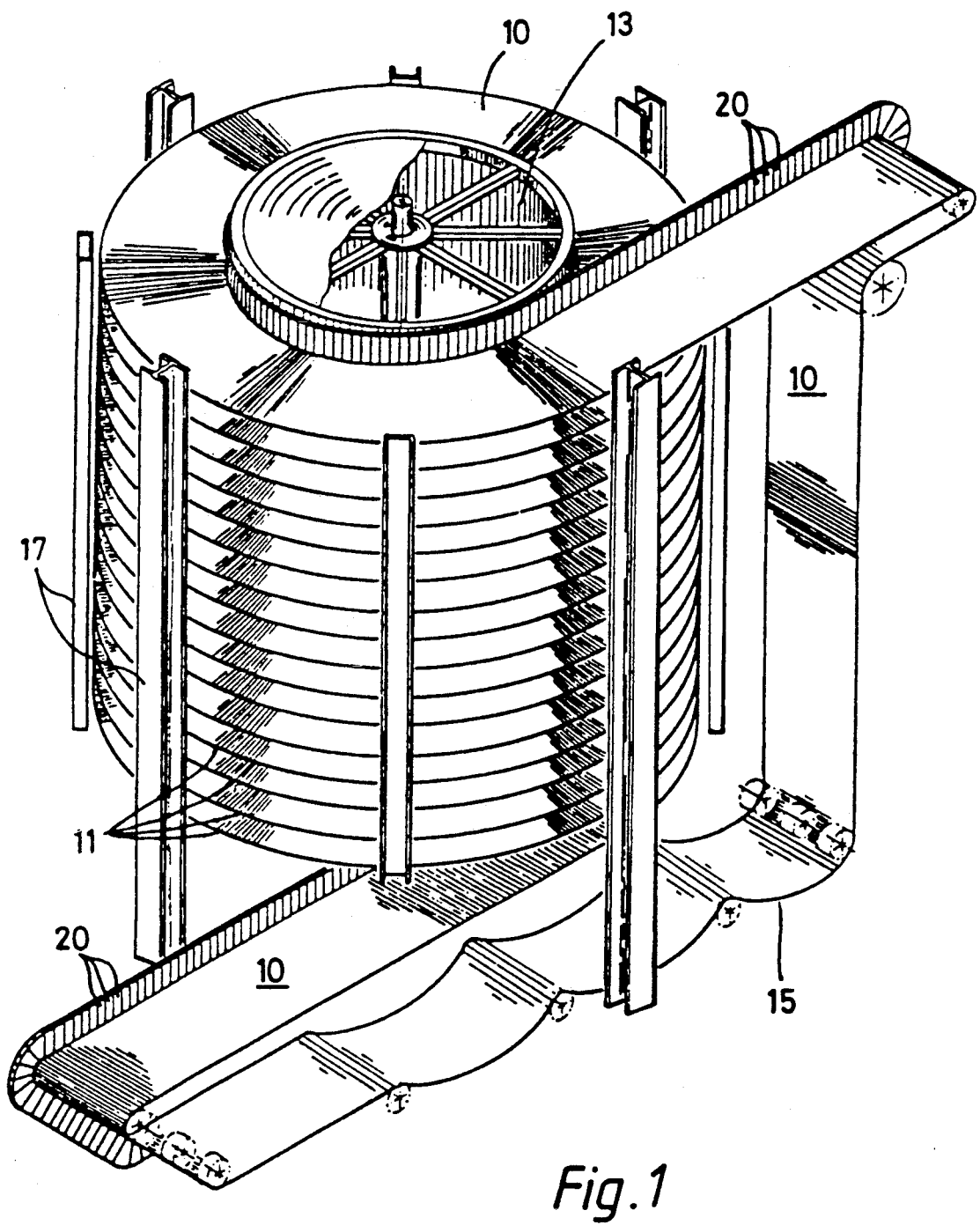
FIG. 1 is a pictorial view of a spiral conveyor.

Referring to FIG. 1, reference numeral 10 denotes an Ashworth-type flexible conveyor belt. This belt, as known in the art, comprises transverse rods extending between articulated links which form the longitudinal edges of the belt, said rods supporting a flexible mesh of stainless steel wire or plastics material, which forms the surface of the belt on which in use a product is conveyed. By virtue of the articulated links, the belt is able to flex in such a manner that the transverse rods are displaced closer together at either one longitudinal edge of the belt than at the other, and also to flex in a direction transverse to the plane of the belt. This Ashworth-type belt is thereby able to follow a relatively tortuous conveying path. FIG. 1 shows an endless Ashworth-type conveyor belt 10 whereat the belt is arranged, over a major part of its length to follow a helical conveying path consisting of a stack of helically extending tiers 11.

The Ashworth-type belt is intended to be used under a tension kept below a predetermined threshold, and in the case of a helical conveying path it is known to impart the drive from an internal capstan in the form of a drum or cage on the inside of the helix. In the present conveyor, the conveyor belt 10 is self-supporting on the inside of the helix, by means of spacer plates 20, and on the outside of the helix the conveyor belt is supported by a fixed helically extending guide (not shown, but carried on the inside of the vertical posts 17). Because this outer guide is required only to take part of the weight of the belt and the product, and is not required to extend across the product space, the helically extending tiers 11 of the conveyor belt 10 do not have to be spaced by a distance substantially exceeding that necessary for accommodation of the product. The guide on the outside of the helix is conveniently a lipped rail provided with a plastics capping on which the outer longitudinal edge of the conveyor belt 10 is supported and over which it can freely slide. The plastics capped rail supports the belt just inside the articulated links forming the outside longitudinal edge of the belt.

FIG. 1 shows the internal drum or cage 13 employed to drive the Ashworth-type belt 10. The return path of the conveyor belt, from the top back to the bottom of the helical conveying path, is generally indicated by reference 15.

The spacer plates 20, for example provided on alternate conveyor links on the inside longitudinal edge of the conveyor belt 10, may be incorporated into the belt during manufacture thereof, but alternatively added to the belt as a separate production step. The plates 20 connect between a pair of transverse rods 12 of the conveyor belt by means of a slot, in the case of at least one rod, so as not to detract from the flexibility of the belt.

For further details of the above-described conveyor illustrated in FIG. 1, reference may be made to our European Patent Application No. 0293095A1, which corresponds to U.S. Pat. No. 4,858,750, issued Aug. 22, 1989.

Figure 3:
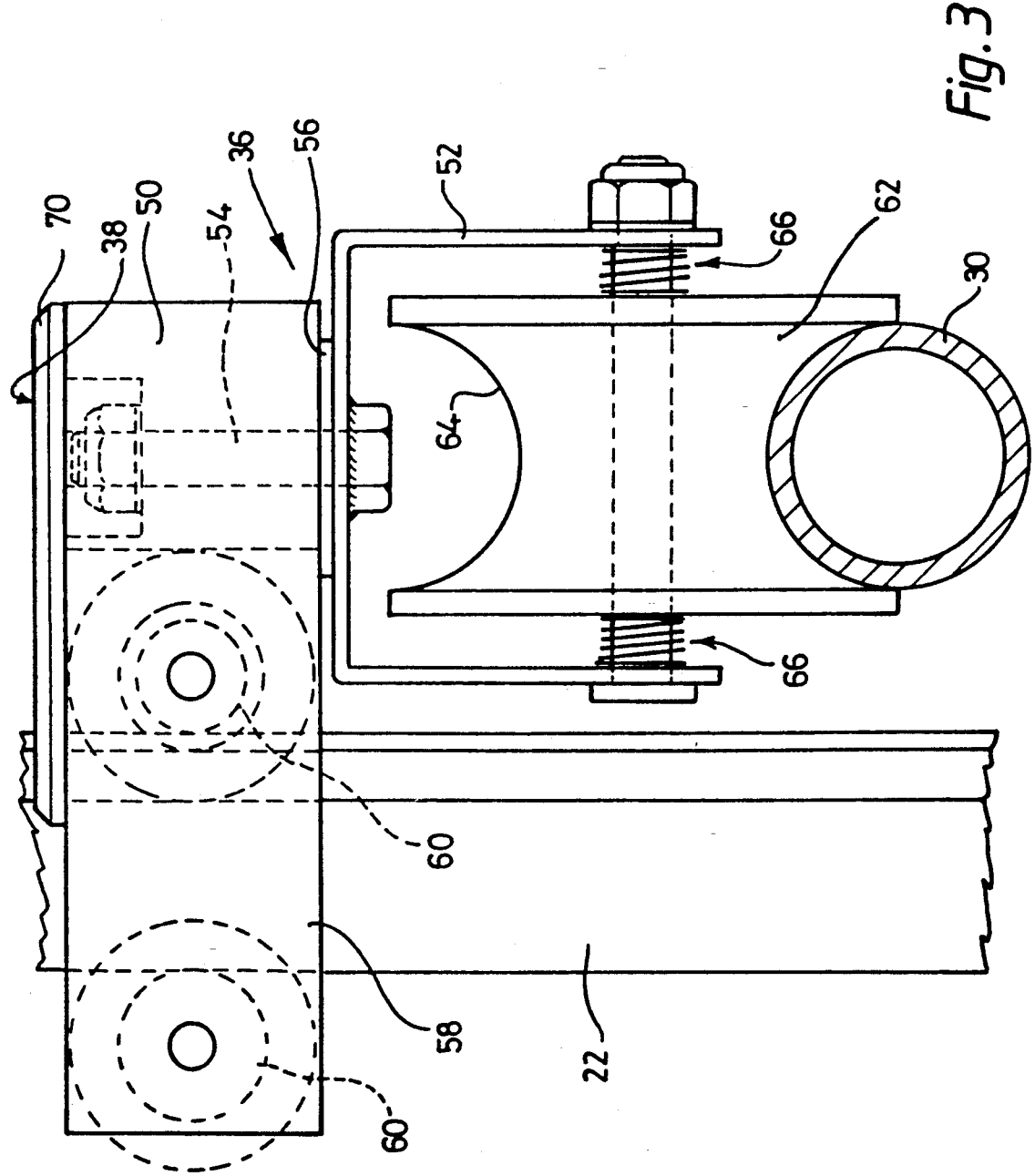
FIG. 3 is a side elevational view of one of the trolleys visible in FIG. 2.
Figure 4:
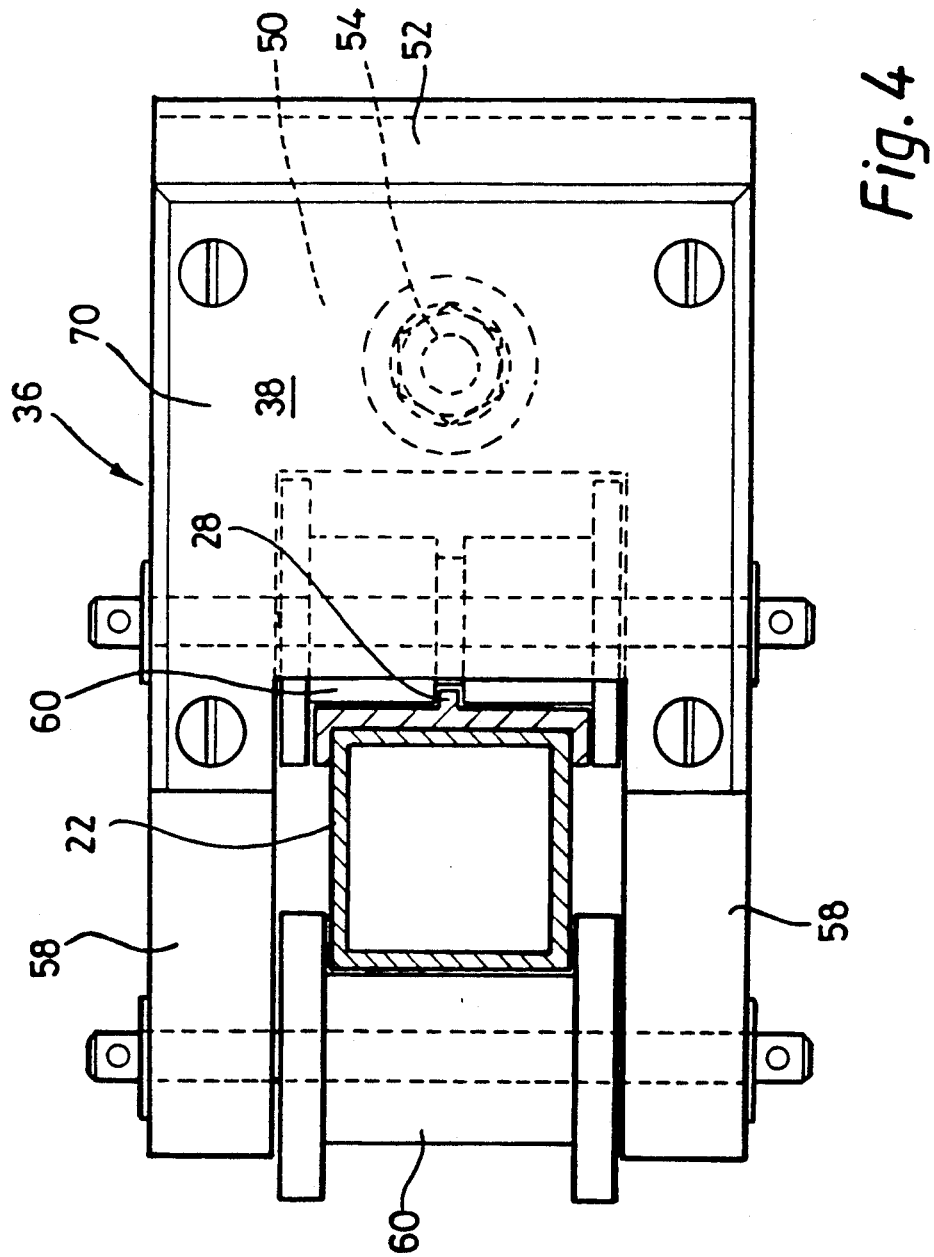
FIG. 4 is a plan view of the trolley.

The present invention is concerned with a means for supporting the lowermost tier of the conveyor belt. As the conveyor belt is supported by a fixed guide at its outside edge and is self-supporting at its inside edge, the supporting means for the lowermost tier effectively determines the pitch of the helical conveying path, to which the fixed helical guide for the outside edge of the belt must also conform. The supporting means in question is shown in FIGS. 2 to 4.

Figure 2:
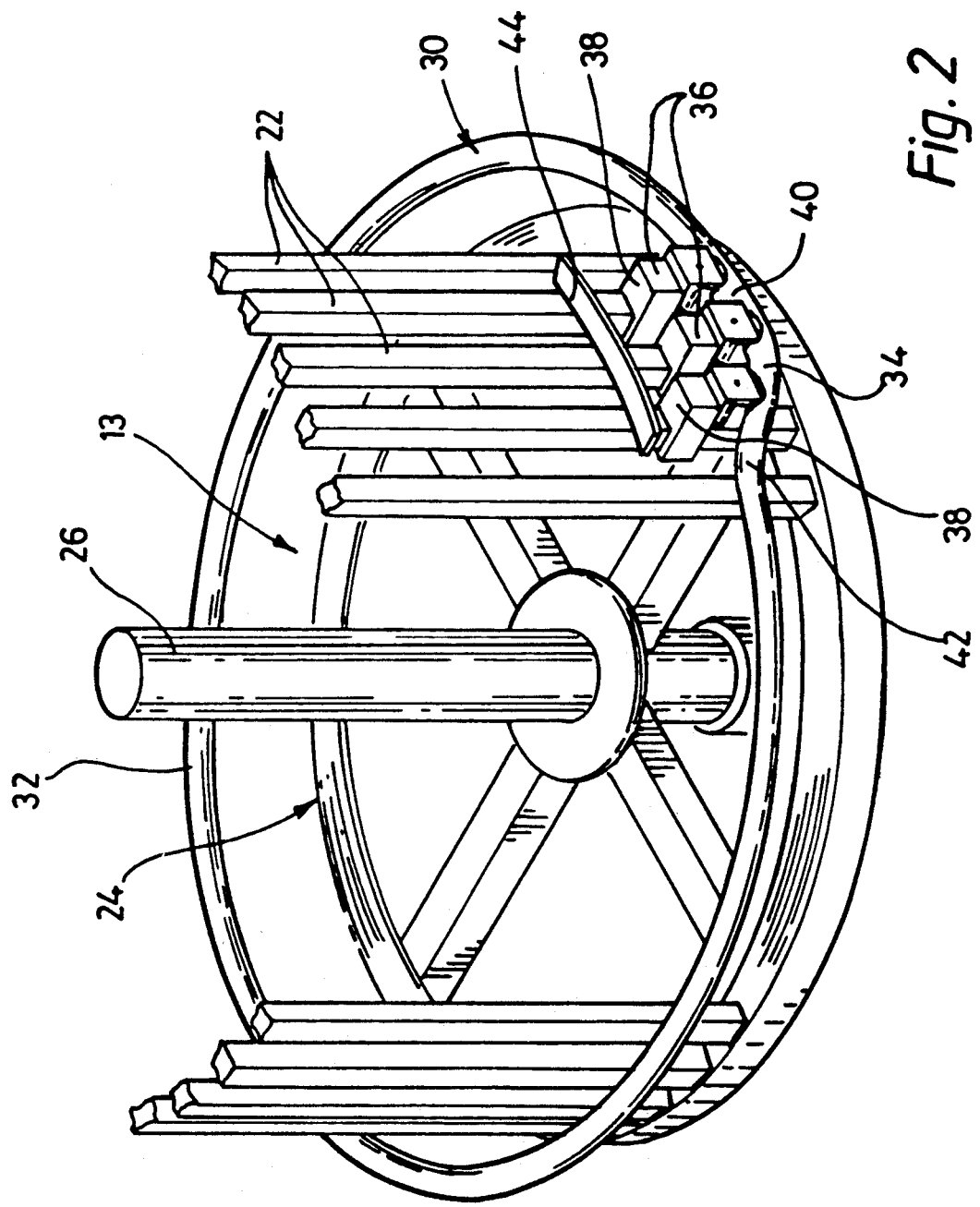
FIG. 2 shows a means in accordance with the invention for supporting the lowermost tier of the conveyor belt.

FIG. 2 shows that the capstan 13 comprises a cage-type drum with vertical bars 22 upstanding from a circular base 24, to which a drive is imparted by suitable power means (not shown) in use to drive the drum in rotation about a vertical centre shaft 26. The Ashworth-type conveyor belt, omitted from FIG. 2 for reasons of clarity, is driven at its inside edge by a projecting rib 28 (see FIG. 4) formed on a facing on each of the cage bars 22, which rib suitably cooperates with the inside edge of the belt. For simplicity, in FIG. 2, only a few bars 22 of the drum are illustrated.

For supporting the lowermost tier of the belt, there is provided a fixed support ring 30 in the form of a round cross-sectioned rail which over the major part 32 of its length extends in a helical path of pitch corresponding to the pitch of the helical conveying path. The remaining minor part of the ring comprises a transition section 34 returning from the upper end of the major part 32 to the lower starting point of the major part.

Trolleys, generally referenced 36, are mounted on the support ring 30, and have upper surfaces 38 with which the inner edge of the belt directly cooperates for support. One trolley 36 is provided for each bar 22 of the internal drum 13, and each said trolley is directly driven around the support ring 30, individually and positively, by the bar with which it is associated.

This, in use, the conveyor belt returning to the bottom of the stack via the return path 15 (FIG. 1) is picked up by the trolleys 36 at the starting point 40 of the major part of the support ring 30 and moves with the trolleys 36 around the support ring until the start 42 of the transition section 34 is reached. The belt then slides over a transition plate 44, fixedly mounted with the support ring above the transition section 34 thereof, and at the end of this transition plate the belt engages over the start of the lowermost tier of the belt which is moving around the support ring with the trolleys. At the transition section 34, the trolleys 36 drop away from the belt and pass beneath the transition plate 44 to the lower level at which the belt is first picked up.

The illustrated conveyor is especially although not exclusively intended for use in industrial freezing equipment, wherein a product is intended to be conveyed through a cold enclosure in order to freeze said product. Accordingly, the trolleys 36, shown in detail in FIGS. 3 and 4, are designed for use in the environment of an industrial freezer.

Each trolley 36 comprises a rectangular block 50 of UHMW plastics material, below which is an inverted-U bracket 52 pivotally mounted to the block by vertical pivot bolt 54, with an anti-friction plastics washer 56 interposed between the lower surface of the block and the upper surface of the bracket. To one side of the bracket 52, the block 50 divides into two parallel arms 58 between which are spindle mounted two rollers 60 of UHMW plastics material. The rollers 60 are spaced apart for engaging and rolling on two opposite faces, the inner and outer faces, of a vertical bar 22 of the internal drum 13 (FIG. 2). The bar 22 thus serves to drive the trolley around the support ring 30, whilst permitting its vertical component of movement in travel around the support ring and also maintaining the orientation of the trolley.

Reverting to the pivotally mounted inverted-U bracket 52, this supports a wheel 62 of UHMW plastics material, said wheel having a concave peripheral edge face 64 for cooperation with the surface of the round cross-sectioned support ring 30. The wheel 62 is spindle mounted between the limbs of the bracket 52 with the interposition of two coil springs 66, which allow the wheel a freedom for limited movement along the spindle on which it is mounted, i.e. generally in the direction of the radius of the support ring. This freedom for limited movement, taken in conjunction with the pivotal mounting of the bracket 52 which carries the wheel, ensures free running of the trolley around the support ring 30 notwithstanding any small manufacturing deviations and tolerances which may cause said ring to depart from its nominally helical path.

The trolley 36 is completed by a cover 70 of UHMW plastics material, which provides the upper surface 38 on which the inner edge of the conveyor belt rests when the trolley is being driven around the support ring 30 to define the lowermost tier of the helical conveyor.

The use of UHMW plastics material for the major components of the trolleys 36 renders lubrication unnecessary, due to the low coefficient of friction of such material, whilst its hardness (and thus resistance to abrasion and durability) also assists in ensuring free movement of the trolleys up and down the vertical bars of the internal cage. The non-water-absorbent characteristic of the material is also important in the context of industrial freezers.

It will be appreciated that the above-described and illustrated embodiment of conveyor may be modified in various ways within the scope of the invention hereinbefore defined.

I claim:

1. A conveyor system, comprising:

an endless conveyor belt, a portion of a length of which is caused to follow a helical conveying path which includes a plurality of tiers stacked in a self-supporting manner with one tier on top of the tier below it at an inside edge of the helical conveying path;

a drum located inside the helical conveying path;

means for driving the drum in rotation about a substantially vertical central axis, said drum driving said endless conveyor belt above a lowermost tier of the stack of tiers;

a plurality of spaced trolleys mounted on a fixed helically extending rail located at the bottom of the stack of tiers on the inside of the helical conveying path, the trolleys having surfaces on which the lowermost tier of the stack of tiers rests for support at the inside edge of the helical conveying path; and, driving means wherein the trolleys are individually driven directly by the drum in which the helically extending rail extends around a single turn of substantially 360°, extending in a helical path around an arcuately major part of said single turn and over a remaining arcuately minor part having a transition section via which, when in use, the trolleys descend from a raised end of said major part to a lower starting point of said major part.

2. The conveyor system according to claim 1, wherein above the transition section, said endless conveyor belt is supported by a fixed transition plate, beyond the end of the transition plate being the next tier of the stack of tiers above the lowermost tier.

3. The conveyor system according to claim 2, wherein the trolleys are slidably attached to vertical guides carried by the drum.

4. The conveyor system according to claim 2, wherein the trolleys are slidably attached to vertical guides forming part of the drum.

5. The conveyor system according to claim 1, wherein the trolleys are slidably attached to vertical guides carried by the drum.

6. The conveyor system according to claim 1, wherein the trolleys are slidably attached to vertical guides forming part of the drum.

7. The conveyor system according to claim 1, wherein said rail is a support rail of substantially round cross-section, the trolleys each having at least one wheel with a concavely curved rim for running on said rail.

8. The conveyor system according to claim 7, wherein each trolley has a pair of opposed rollers which engage opposite sides of vertical guides of the drum in order to maintain the trolley in a substantially constant or upright orientation while being driven around the support rail.

9. The conveyor system according to claim 8, wherein said at least one wheel on each trolley which further includes spring mounting means for allowing limited movements thereof substantially along a radius of the helix defined by the support rail.

10. The conveyor system according to claim 9, wherein said at least one of the wheels is carried by a supporting element which forms a part of the trolley and is pivotally mounted about a vertical axis to allow for a limited turning movement of at least one of the wheels.

11. The conveyor system according to claim 10, wherein said at least one of the wheels and the pair of opposed rollers of each trolley are made of an ultra-high molecular weight plastic material.

12. A conveyor system comprising:

a product conveyor belt following an endless path having a helical path portion and a return path portion, said helical path portion having a bottom tier;

a rotatable drive cage disposed generally with said helical path portion and drivingly engaging said conveyor belt along at least a portion of said helical path portion;

a continuous support rail positioned generally along said bottom tier, said rail having a helical rail portion generally along said helical path portion and a sloping rail connecting portion;

a trolley having at least one trolley wheel riding on said support rail, said trolley carrying at least a portion of said conveyor belt along said bottom tier; and connecting means for connecting said trolley to said drive cage so that said drive cage as it rotates drives said trolley on said trolley wheel and along said helical rail portion.

13. The conveyor system according to claim 12, wherein said trolley is drivable directly by the rotatable drive cage in which said helical rail extends around a single turn of substantially 360°, extending in a helical path around an arcuately major part of said single turn and over a remaining arcuately minor part having a transition section via which, when in use, said trolley descends from a raised end of said major part to a lower starting point of said major.

14. The conveyor system according to claim 13, wherein above the transition section, said product conveyor belt is supported by a fixed transition plate, beyond the end of the transition plate beings the next tier of the stack of tiers above the lowermost tier.

15. The conveyor system according to claim 14, wherein said trolley is slidably attached to vertical guides carried by the rotatable drive cage.

16. The conveyor system according to claim 14, wherein said trolley is slidably attached to vertical guides forming part of the rotatable drive cage.

17. The conveyor system according to claim 12, wherein the trolley is slidably attached to vertical guides carried by the rotatable drive cage.

18. The conveyor system according to claim 12, wherein the trolley is slidably attached to vertical guides carried by the rotatable drive cage.

19. The conveyor system according to claim 12, wherein said continuous support rail has a substantially round cross-section, the trolley having at least one wheel with a concavely curved rim for running on said continuous support rail.

20. The conveyor system according to claim 19, wherein said trolley has a pair of opposed rollers which engage opposite sides of vertical guides of the rotatable drive cage in order to maintain the trolley in a substantially constant or upright orientation while being driven around the continuous support rail.

21. The conveyor system according to claim 20, further comprising at least one wheel on the trolley which further includes spring mounting means for allowing limited movements thereof substantially along a radius of the helix defined by the continuous support rail.

22. The conveyor system according to claim 21, wherein at least one of the wheel sis carried by a supporting element which forms a part of the trolley and is pivotally mounted about a vertical axis to allow for a limited turning movement of at least one of the wheels.

23. The conveyor system according to claim 22, wherein at least one of the wheels and the pair of opposed rollers of each trolley are made of an ultra-high molecular weight plastic material.

24. An endless conveyor having a conveyor belt, a portion of the length of which is caused to follow a helical conveying path comprising a plurality of tiers stacked on top of one another, including a fixed helical guide supporting the outside edge of the conveyor belt on the helical conveying path, and the inside edge of the conveyor belt being supported one on top of another by an arrangement which includes articulated links, at least some of which are equipped with spacers in the form of upstanding plates, the tops of which, at any one tier, engage the underside of the links or plates associated with the next tier above, means supporting the inside edge of the bottom helical tier of the conveyor belt comprising a fixed helical support rail and roller means interposed between said rail and said inside edge portion of the bottom helical tier, whereby the tiers are supported one on the other, and means whereby the inside edge of the conveyor is driven from an internal drum or capstan.

* * * * *